MAGNETIC RECORDING SYSTEM
Filed Nov. 30, 1960
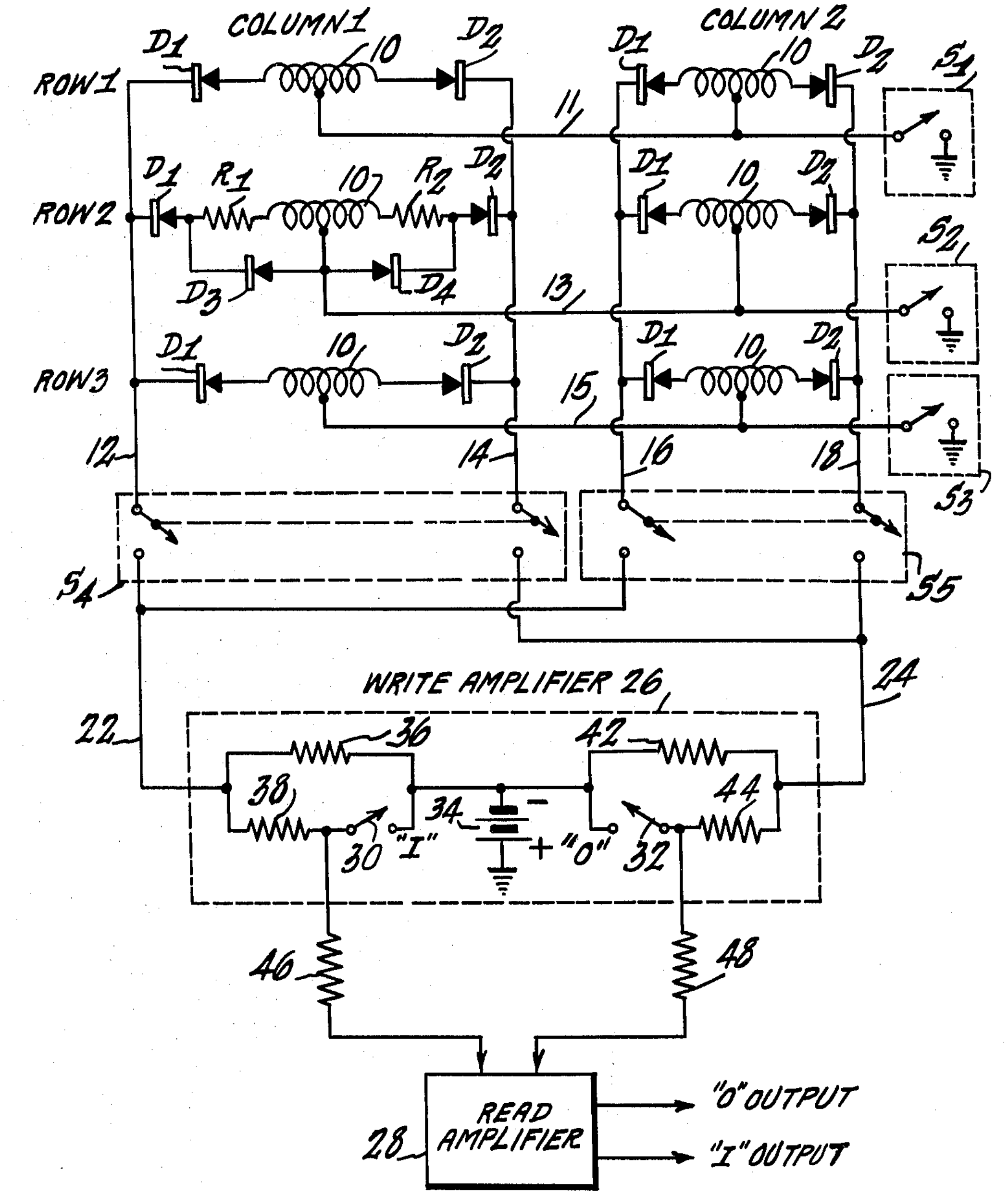
INVENTOR.
Thomas R. Mayhew
BY
Carl V. Olson
ATTORNEY United States Patent Office 3,248,717

Patented Apr. 26, 1966

3,248,717

MAGNETIC RECORDING SYSTEM

Thomas R. Mayhew, Levittown, N.J., assignor to Radio Corporation of America, a corporation of Delaware Filed Nov. 30, 1960, Ser. No. 72,747
3 Claims. (Cl. 340—174.1)

This invention relates to magnetic recording and reproducing systems such as may be employed in digital computers, and more particularly to an arrangement for preventing the accidental erasure of magnetically recorded information.

It is known to store information on movable magnetic medium, for example a drum, by means of a large plurality of magnetic heads positioned to define an equal plurality of recording tracks on the medium. Each magnetic head is used both to write information on the associated recording track and to read information from the track. It is not necessary to provide separate write and read amplifiers for each magnetic head because a single write amplifier and a single read amplifier can be selectively connected to any desired one of the magnetic heads by means of a matrix head selection system.

In the use of an electronic digital computer it is often desired to store information on one or more magnetic recording tracks for repeated use. The stored recorded information is read out and used whenever needed. In these circumstances it is important to prevent the inadvertent and accidental erasure of the recorded information. Such erasure will occur if the original information is overwritten by new information. This can come about as the result of a mistake on the part of the programmer, as the result of failure of some operating voltage or circuit in the computer, or as a result of maintenance activities.

It is therefore a general object of this invention to provide improved means for permitting a magnetic head to read magnetically recorded information while positively preventing inadvertent erasure by the same head.

These and other objects and aspects of the invention will be apparent from the following more detailed description taken in conjunction with the appended drawing, wherein:

The sole figure of the drawing is a simplified circuit diagram of a magnetic recording and reproducing system including a write amplifier and a read amplifier connected through a switching matrix to a plurality of magnetic heads, at least one of which is constructed according to the invention to positively prevent the inadvertent erasure of information recorded on an associated track, while permitting the reading of the information at will.

The system shown in the accompanying drawing includes the operating coils 10 of six magnetic heads each having an associated pole piece (not shown). The magnetic heads may be physically arranged in any convenient manner along the surface of a rapidly rotating magnetic drum (not shown). In the drawing, the coils 10 of the six heads are shown arranged in three rows and two columns to illustrate their electrical connection in a matrix by means of which any one of the heads may be selected for the purpose of writing information on the associated magnetic track or for the purpose of reading information from the associated track.

Each of the head coils 10 is provided with a centertap connection. The centertaps of coils 10 in the first row of the matrix are all connected through a row 1 selection bus 11 to a switch $S_1$. Similarly, the centertaps in the coils 10 in the second row are connected through a row 2 selection bus 13 to a switch $S_2$, and the centertaps in the third row are connected through a row 3 selection bus 15 to a switch $S_3$.

One terminal of each coil 10 in column 1 is connected through a diode $D_1$ to a column selection bus 12. The other terminal of each coil 10 in column 1 is connected through a diode $D_2$ to a second column selection bus 14. In a similar manner, the terminals of the coils 10 in column 2 are connected through diodes $D_1$ and $D_2$ to column selection buses 16 and 18, respectively. The column 1 selection buses 12 and 14 are connected through a column 1 selection switch $S_4$ to main buses 22 and 24. Similarly, the column 2 buses 16 and 18 are connected through a column 2 selection switch $S_5$ to main buses 22 and 24. The main buses 22 and 24 are connected to a single write amplifier 26 and a single read amplifier 28. It is understood that while the drawing shows a system including only six magnetic heads, this is illustrative of systems wherein a great many magnetic heads, such as for example 128 heads, are employed in association with a single write amplifier and a single read amplifier.

The row selection switches $S_1$, $S_2$ and $S_3$ are shown in simplified form as simple mechanical switches. In practice, these switches will normally be constituted by conveniently and rapidly actuatable electronic switching devices, such as transistors. Similarly, the column selector switches $S_4$ and $S_5$ will preferably be constituted by transistor switches.

The write amplifier 26 is also illustrated in simplified form as including a mechanical write "1" switch 30 and a write "0" switch 32. The switches 30 and 2 actually may be electronic circuitry (such as transistors) which may be conveniently and rapidly controlled. The write amplifier 26 includes a source of unidirectional potential such as battery 34. The battery 34 is connected through a resistor 36 to the main bus 22, and is also connected through a parallel path including switch 30 and resistor 38 to the main bus 22. The battery 34 is similarly connected to the main bus 24 through resistor 42, switch 32 and resistor 44. The main bus 22 is connected to the read amplifier 28 through the resistor 38 in the write amplifier 26 and the coupling resistor 46. Similarly the main bus 24 is connected to the other input of the read amplifier 28 through the resistors 44 and 48. The read amplifier 28 has "0" and "1" outputs for the respective digital information signals.

Additional circuit elements are associated with the magnetic head located in column 1, row 2. This magnetic head is one which is associated with a magnetic track having information recorded thereon which must be protected from accidental erasure. The magnetic head in column 1, row 2 differs from the other heads in that a resistor $R_1$ is inserted between the coil 10 and the diode $D_1$, and a resistor $R_2$ is inserted between the coil 10 and the diode $D_2$. A diode $D_3$ is connected from the centertap of the coil across half of the coil and the resistor $R_1$. A diode $D_4$ is connected from the centertap of the coil across the other half of the coil and the resistor $R_2$. The diodes $D_1$ through $D_4$ are all poled to provide easy current flow in the same direction between the centertap and the column selector buses 12 and 14.

The operation of the system in the accompanying drawing will now be described. When it is desired to write digital information on the magnetic track associated with the magnetic head in row 1, column 1, the row 1 selector switch $S_1$ is closed, and the column 1 selector switch $S_4$ is closed. When the row 1, column 1 is thus selected, current can flow from ground through the row 1 bus 11, the left half of coil 10, the diode $D_1$, the column 1 selection bus 12, the left contact of the switch $S_4$, the main bus 22 and the resistor 36 in the write amplifier 26 to the negative terminal of battery 34. Current can also flow from the centertap of coil 10 through right-hand half of the coil 10, the diode $D_2$, the column 1 bus 14, the right contact of the switch $S_4$, the main bus 24 and resistor 42 in write amplifier 26 to battery 34. The amount of current which is permitted to flow in the described paths upon the closing of selection switches $S_1$ and $S_4$ is limited by the resistors 36 and 42. The voltage applied across the diodes $D_1$ and $D_2$ is such as to bring the operating point of the diodes to the knee of the current-voltage characteristic curve where the diodes are just conductive but pass very little current. Therefore, the selection current flowing through the coil 10 does not have any effect on the information recorded on the corresponding magnetic track.

When it is desired to write on the track associated with the row 1, column 1 head, the switches 30 and 32 in the write amplifier 26 are actuated at different times, the closing of switch 30 being effective to write "1" on the track, and the closing of switch 32 being effective to write "0" on the track. The closing of switch 30 to write "1" results in a flow of current from the centertap through the left-hand half of the coil 10. The closing of switch 32 to write "0" results in a current flow from the centertap of coil 10 through the right-hand half of coil 10. It is thus seen that the currents in the coil 10 are in opposite directions when writing "1" and "0." The closing of switches 30 and 32 causes currents to flow in the coil 10 which are much larger than the selection currents because the resistors 38 and 44 in parallel with resistors 36 and 42 respectively provide much less impedance to the flow of current than do the permanently connected resistors 36 and 42.

When it is desired to read what has been written on the magnetic track under the row 1, column 1 head, the selection switches $S_1$ and $S_4$ are closed, and the voltages induced in the coil 10 are coupled through the diodes $D_1$ and $D_2$, the column 1 buses 12 and 14, and the resistors 38, 46, and 44, 48 to the inputs of the read amplifier 28. The currents induced in the coil 10 during the read operation are small relative to the selection currents flowing through the coil and through the diodes $D_1$ and $D_2$. The diodes $D_1$ and $D_2$ are rendered conductive by the selection currents and they present a low impedance to the relatively small amplitude induced currents flowing in either direction. Depending on the stored signal, more current will flow through one of the diodes $D_1$ and $D_2$ and less current will flow through the other. The read amplifier 28 is a difference amplifier which receives the induced currents on the two buses 12 and 14 (or 22 and 24) and provides an output on one or the other of its output leads depending on whether the information bit read happens to be a "0" or a "1."

The row 2, column 1 head, when selected by selection switch $S_2$ and $S_4$, provides induced currents which are applied to the read amplifier 28 and are thereby read in the same manner as has been described in connection with the row 1, column 1 head. However, the row 2, column 1 head, by virtue of the additional elements $R_1$, $R_2$, $D_3$ and $D_4$, is incapable of writing information on the associated magnetic track. If the switch 30 in write amplifier 26 is closed (as by accident), a write "1" current will start to flow from the switch $S_2$ through the row 2 bus 13, the centertap of coil 10, the left half of coil 10, the resistor $R_1$, the diode $D_1$, the column 1 bus 12, the main bus 22, the resistor 38 and the switch 30 to the negative terminal of battery 34. As soon as this current starts to flow through the resistor $R_1$, a voltage is developed across resistor $R_1$ which almost immediately becomes sufficient to render the diode $D_3$ fully conductive. Thereafter, diode $D_3$ presents a very low impedance to the flow of current compared with the impedance presented in the parallel path constituted by the resistor $R_1$ and the left-hand half of the coil 10. In these circumstances, practically all of the write "1" current is shunted from the left-hand half of coil 10 through the diode $D_3$. It is therefore impossible for a write current to flow through the coil 10 in such magnitude as to disturb the magnetic condition of the associated magnetic track. In a similar manner, when the write "0" switch 32 is closed, a write current is prevented from flowing through the right-hand portion of coil 10 by the shunting action of the diode $D_4$.

Resistors $R_1$ and $R_2$ have a low value, such as 25 ohms, and do not interfere with the currents induced in the coil 10 and applied to the read amplifier 28 during the read operation. This is because the resistance of resistors $R_1$ and $R_2$ is very small (less than one-twentieth) compared with the other resistance in the path to the read amplifier 28, including the input resistance of the read amplifier 28.

If it is desired to erase the information on the track associated with the row 2, column 1 head, it is only necessary to disconnect one side of each of diodes $D_3$ and $D_4$ so that the head will be capable of recording new information. Thereafter, the diodes $D_3$ and $D_4$ can be reconnected. Then, it will be impossible for the new information recorded on the associated magnetic track to be inadvertently or accidentally erased or written over.

It is thus apparent that according to the teachings of this invention there is provided a simple and effective means for positively preventing the accidental erasure of information on a magnetic track associated with a particular magnetic head, while at the same time permitting information to be read from the track by the magnetic head.

What is claimed is:

1. In a magnetic recording and reproducing system having a plurality of magnetic tracks and associated magnetic heads any one of which may be effectively coupled to a single writing circuit and a single reading circuit, said heads each including a magnetic pole piece and a coil, means to prevent the inadvertent destruction of recorded information on one of said tracks by coupling the writing circuit to the associated magnetic head comprising a resistor connected in series with said coil and a diode connected across the series combination of coil and resistor, said diode being selected and poled to provide a low impedance shunt path for writing currents to prevent the flow of sufficient writing current through the coil to disturb the previously recorded information and to provide a high impedance shunt path which does not interfere with reading the information on the track.

2. In a magnetic recording and reproducing system having a plurality of magnetic tracks and associated magnetic heads any one of which may be effectively coupled to a single writing circuit and a single reading circuit, said heads each including a magnetic pole piece and a centertapped coil having end terminals, means to prevent the inadvertent destruction of recorded information on one of said tracks by coupling the writing circuit to the associated magnetic head, the combination comprising two resistors each connected in series with a different terminal of said coil and two diodes each connected respectively across the series combination of a half of said coil and the associated one of said resistors, said diodes being selected and poled to provide a low impedance shunt path for writing currents to prevent the flow of sufficient writing current through the coil to disturb the previously recorded information, and to provide a high impedance shunt path to the relatively low amplitude induced currents developed when reading the information on the track.

3. In a magnetic recording and reproducing system, a recording medium, a plurality of magnetic heads for movement relatively along tracks on said medium, each of said magnetic heads including a head coil, a write amplifier, a read amplifier, means to selectively couple one of said head coils at a time to said amplifiers, an impedance interposed in series with the head coil of one of said magnetic heads, said impedance having a value which is very small in relation to the other impedances in the amplifiers which are in circuit with the head coil when the head coil is connected to the amplifiers, and a diode connected in shunt with said series-connected head coil and impedance, said diode being selected and poled to shunt through the diode any current capable of writing over previously recorded information on the associated track.

References Cited by the Examiner

UNITED STATES PATENTS

| | | | |
|---|---|---|---|
| 1,883,613 | 10/1932 | Devol | 323—79 |
| 2,698,875 | 1/1955 | Greenwood | 346—74 |
| 3,019,420 | 1/1960 | Reinholtz | 340—174.1 |

FOREIGN PATENTS

| | | |
|---|---|---|
| 1,179,383 | 12/1958 | France. |
| 719,281 | 12/1954 | Great Britain. |

IRVING L. SRAGOW, *Primary Examiner.*

NEWTON N. LOVEWELL, *Examiner.*

D. G. REDINBAUGH, R. M. JENNINGS, J. F. BREIMAYER, *Assistant Examiners.*